3,145,184
LEAD-CONTAINING CERAMIC STRUCTURES FOR RADIATION SHIELDING
Herbert Schumann, Munich, Germany, assignor to Firma Paul Rauschert Kommanditgesellschaft, Pressig-Rothenkirchen, Germany
No Drawing. Filed May 8, 1961, Ser. No. 108,277
Claims priority, application Germany June 14, 1960
2 Claims. (Cl. 252—478)

The development of atomic energy techniques is accompanied by an increasing demand for radiation protective materials, especially for such conventional building materials or blocks as are used in known manner to build rooms or structures, which are endangered by X-rays, cathode rays or γ-rays as well as by emission of neutrons. The invention has for its object a radiation protective material, which can be prepared and processed by conventional methods and the present apparatus used in the ceramic industry and which can be shaped into building blocks of the usual form, such as wall- and base plates, tiles, bricks, and also especially shaped members, e.g. for a reactor structure, in order that they may be adapted to the various structural requirements.

The invention starts from the known radiation protective action of lead and its compounds and has for its object a material which contains in addition to lead or lead compounds, cerium, especially in the form of monazite sand and which can be sintered at conventional temperatures to a ceramic in the form of firm and compact radiation protective materials.

The crude substances are in the form of their natural minerals that is especially as monazite sand, applicable in the unpurified state. As experiments have shown, detrimental impurities do not have a radiation absorbing effect. The following examples explain the practical application of the invention, but it is to be emphasized that the composition of the crude substance depends on the particular practical requirements, especially on demands placed on the materials with regard to temperature resistance.

*Example 1*

A mixture of 55% lead oxide, 35% monazite sand and 10% zirconium sand is ground, e.g. in a ball mill, mixed and formed into a mouldable material by a conventional ceramic process. Here there is preferably used a pregranulated material with various grain sizes, which is suitable for dry pressing. A dry pressed material has the advantage of a particularly uniform high density. The shaped body prepared from the material can be sintered at a temperature of 1030° C.

*Example 2*

A mixture of 80% lead oxide and 20% monazite sand is prepared and shaped in a similar way. The sintering temperature in this case is 800° C.

*Example 3*

The proportionate amounts of the mixture of Example 2 can be altered, for example to 60% lead oxide and 40% monazite sand. The sintering temperature for this material is 930° C. Before the shaping operation there is advantageously added to the material a plasticiser, such as bentonite or tragacanth.

As already mentioned, the moulded article formed from the material can have any shape required. For the production of an article having a particularly even and easily cleanable surface, the moulded article is coated with a colourless or white glaze.

Experiments have shown that articles prepared in the above manner having protection against radiation have compared with lead not only an essentially higher temperature resistance, but also an even and washable surface, complete homogeneity and little weight and are nontoxic. The absorption value of hard γ-rays is about half as high as that of lead.

What is claimed is:
1. In a radiation shielding, lead-containing ceramic structure, the improvement which comprises that the structure contains about between 20 to 50% by weight of monazite sand and between about 50 to 80% by weight of a lead compound.
2. The improvement of claim 1, wherein the lead compound is lead oxide.

References Cited in the file of this patent
UNITED STATES PATENTS

| 1,576,730 | Harth | Mar. 16, 1926 |
| 1,633,534 | Long | June 21, 1927 |
| 2,726,339 | Borst | Dec. 6, 1955 |

FOREIGN PATENTS

| 209,936 | Australia | Aug. 22, 1957 |

OTHER REFERENCES

AECD–4127, Topical Report on Literature Survey of Treatment for Monazite Sands, (BMI–JKS–1), November, 1947, pp. 7–9.